No. 671,086. Patented Apr. 2, 1901.
P. D. LAIBLE.
DEVICE FOR SEALING OR LOCKING BOTTLES.
(Application filed July 27, 1900.)
(No Model.) 2 Sheets—Sheet 1.
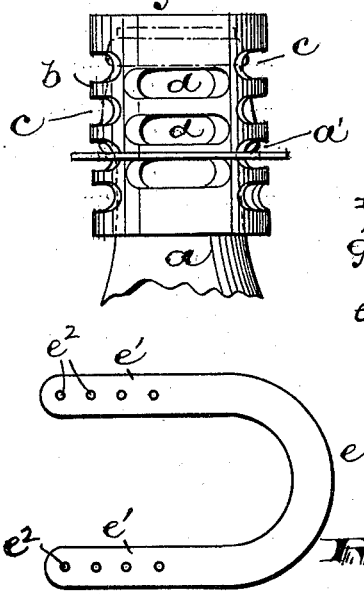
Fig. 1.
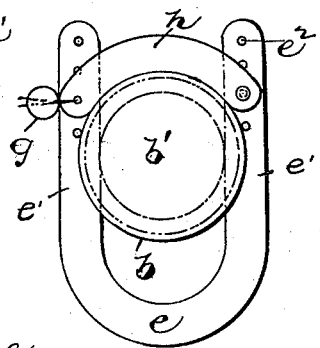
Fig. 5.
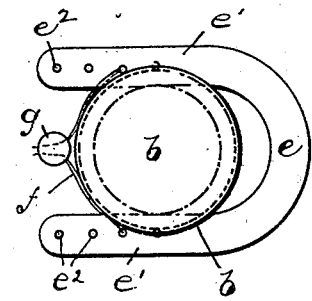
Fig. 4.
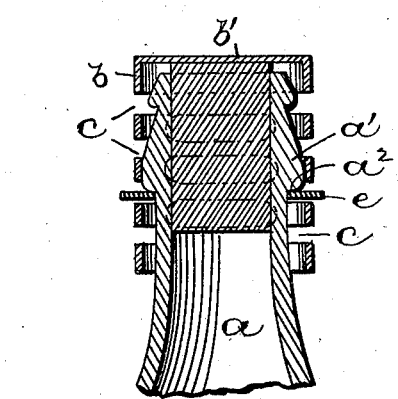
Fig. 6.
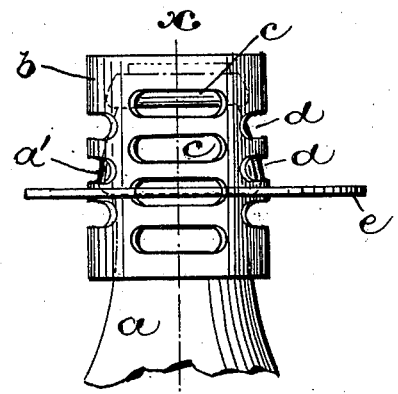
Fig. 3.
Fig. 2.
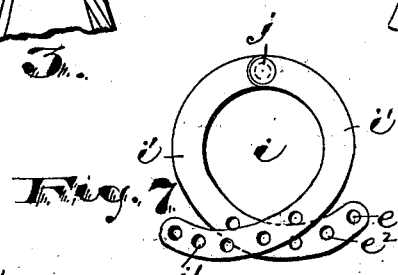
Fig. 7.
Fig. 8.
WITNESSES: Henry King, Russell M. Everett.
INVENTOR: Philip D. Laible,
BY Drake & Co.
ATTORNEYS
THE NORRIS PETERS CO., PHOTO-LITHO., WASHINGTON, D. C.

No. 671,086. Patented Apr. 2, 1901.
P. D. LAIBLE.
DEVICE FOR SEALING OR LOCKING BOTTLES.
(Application filed July 27, 1900.)
(No Model.) 2 Sheets—Sheet 2.

WITNESSES:
INVENTOR
Philip D. Laible,
BY
Drake Co.
ATTORNEYS.

UNITED STATES PATENT OFFICE.

PHILIP D. LAIBLE, OF NEWARK, NEW JERSEY.

DEVICE FOR SEALING OR LOCKING BOTTLES.

SPECIFICATION forming part of Letters Patent No. 671,086, dated April 2, 1901.

Application filed July 27, 1900. Serial No. 24,977. (No model.)

*To all whom it may concern:*

Be it known that I, PHILIP D. LAIBLE, a citizen of the United States, residing at Newark, in the county of Essex and State of New Jersey, have invented certain new and useful Improvements in Devices for Sealing or Locking Bottles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a device for sealing or locking bottles, to thus prevent unauthorized removal of the cork and meddling with the contents, to thereby enable samples for testing or for analysis to be secured against tampering and poisons or the like to be secured against being used by mistake; to obtain a simple, cheap, and efficient construction and one which can be adjusted in size to fit different sizes of bottles, and to secure other advantages and results, some of which may be referred to hereinafter in connection with the description of the working parts.

The invention consists in the improved device for sealing or locking bottles and in the arrangements and combinations of parts of the same, all substantially as will be hereinafter set forth, and finally embraced in the clauses of the claim.

Figure 9:
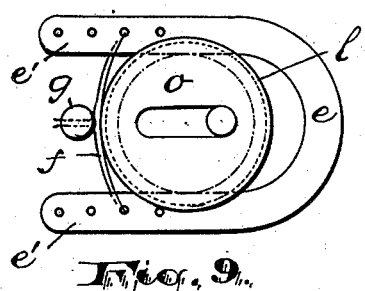
Figure 10:
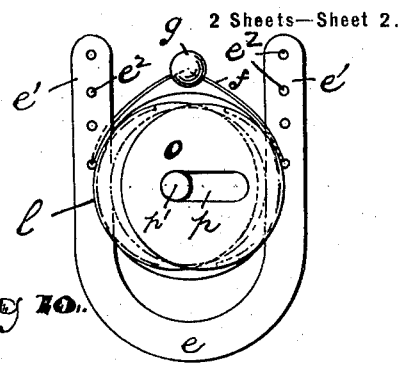
Figure 11:
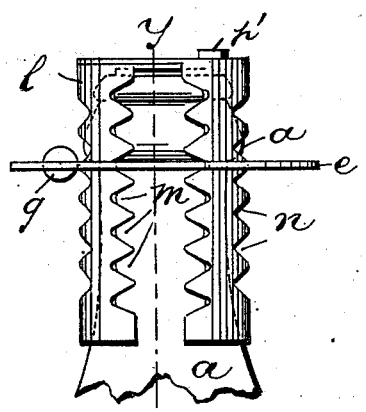
Figure 12:
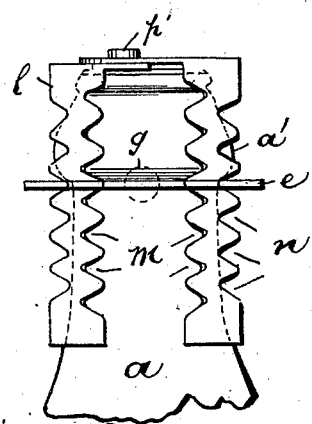
Figure 13:
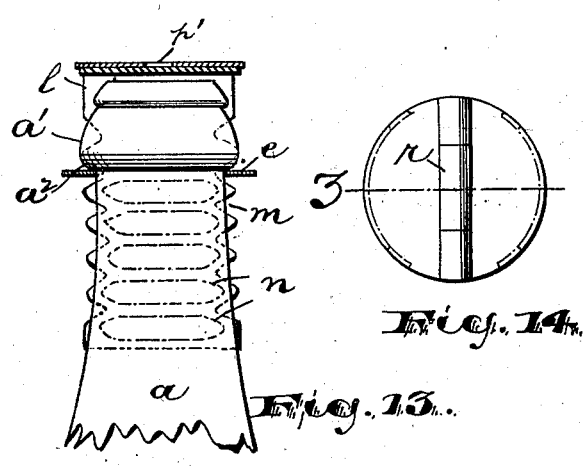
Figure 14:
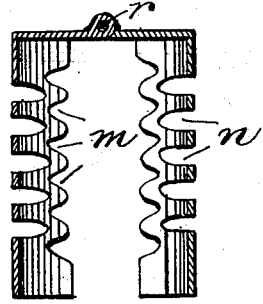
Figure 15:
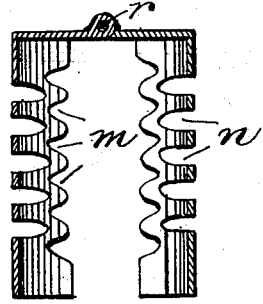

Referring to the accompanying drawings, in which like letters of reference indicate corresponding parts in each of the several views, Figure 1 is a side elevation of my improved device as applied to a bottle. Fig. 2 is a similar view from a point at a quadrant's distance from the point of view in Fig. 1. Fig. 3 is a central section on line $x$, Fig. 2. Fig. 4 is a plan, and Fig. 5 is a similar plan, showing a modified locking-bar. Fig. 6 is a plan of the locking yoke or slide, and Fig. 7 is a modification of the same. Fig. 8 illustrates a sealing-rivet sometimes used. Figs. 9 and 10 are plan views of a form of my invention having a cap adjustable to different sizes, the figures showing said cap in contracted and expanded positions, respectively. Figs. 11 and 12 are side views of the parts as shown in Figs. 9 and 10, respectively. Fig. 13 is a sectional view on line $y$, Fig. 11. Fig. 14 is a plan of a hinged locking-cap, and Fig. 15 is a section of the same on line $z$, Fig. 14.

In said drawings, $a$ indicates the upper or neck portion of a bottle having a head formed at the top by an annular rib $a'$, presenting at the lower side an abrupt shoulder $a^2$. Over this head of the bottle I place a more or less closely fitting cap $b$, preferably formed of a piece of metal tubing having one end $b'$ closed. The cylindrical walls of said cap are at opposite sides of the cap slotted, as at $c$, in a horizontal plane, a series of such pairs of opposite slots being formed up the sides of the cap. Preferably a second series of such slots is formed at a quadrant's distance around the cap from the first series, these second slots $d$ alternating in vertical position with those of the first series. A U-shaped yoke or slide $e$, stamped out of sheet metal and having substantially parallel arms $e'$, is provided to coöperate with the cap $b$. Said yoke is adapted to straddle the neck of the bottle just below the head, the two arms $e'$ sliding for this purpose in opposite slots of the cap, as shown in the drawings.

To lock or seal a bottle, therefore, the cork being in place, the cap $b$ is slipped down over the neck of the bottle, with its closed end $b'$ coming in contact with the cork. The yoke $e$ is then slid in a pair of the opposite slots, such a pair being selected as will bring the arms of the yoke just below the head of the bottle. The yoke is thus wedged between the shoulder $a^2$ on the bottle-head and the wall of the slot in the cap, as shown in Fig. 3, and there can therefore be no escape of the cap from the bottle without removing the yoke. To prevent such removal of the yoke, the ends of the arms $e'$ are provided with openings $e^2$, and through these a wire $f$ may be passed from one arm to the other on the opposite side of the bottle from the closed end of the yoke and its ends secured by a seal $g$. Instead of a wire and seal a chain or chains and small padlock could be used for the same purpose, or a locking-bar $h$ may extend from arm to arm behind the bottle-neck, as shown in Fig. 5, said bar being permanently hinged at one end to one arm and adapted to be removably secured at the other end to the other arm either by sealing, padlock, or any known means.

In Fig. 7 I have shown a modified form of yoke $i$ which may sometimes be used, said yoke having its two arms $i'$ hinged together, as at $j$, and curved inward toward each other at their free ends and having perforations $j'$, which may be brought in coincidence after the yoke is properly applied to the neck of the bottle. A soft sealing-rivet $k$, Fig. 8, may then be passed through or a wire or padlock, as above described.

It sometimes happens that the bottles vary slightly in the size of head, or it may be desirable to have a cap applicable to more than one size of bottle, and to this end I may provide a cap $l$ (shown in Figs. 9, 10, 11, 12, and 13) and which is adjustable in size. This adjustability is secured by simply cutting the cap into two pieces down through the middle of one series of pairs of slots $m$ and then making the closed end $o$ of two overlapping parts, one of which has a slot $p$ and the other a stud $p'$, sliding in said slot. For a larger bottle, then, the two halves of the cap are slid apart, as shown in Fig. 10, and the yoke applied. Again, the two sections of the cap may be hinged together at the top, as at $r$ in Figs. 14 and 15, and thus made quickly and easily applicable to slightly-differing bottles. Various other modifications may be made without departing from the spirit and scope of the invention, and I do not wish to be understood as limiting myself by the positive descriptive terms employed except as the state of the art may require.

Having thus described the invention, what I claim as new is—

1. A device for sealing or locking bottles, comprising a cap adapted to be slipped over the head of the bottle, said cap having opposite lateral slots, a yoke adapted to bestride the neck of the bottle below the head, and lie in the slots of the cap, and means for preventing withdrawal of said yoke, substantially as set forth.

2. A sealing or locking device for bottles, comprising a cap for the top of the bottle, said cap having opposite transverse slots, a yoke adapted to grasp the neck of the bottle and lying in said slots of the cap, and means for preventing removal of said yoke, substantially as set forth.

3. A sealing or locking device for bottles, comprising a cap adapted to be placed over the top of the bottle and engage the cork and having transverse slots in its opposite sides, a yoke having arms adapted to pass one each side of the bottle-neck and lie in said slots in the cap, and means for securing the ends of said arms together, substantially as set forth.

4. The herein-described sealing or locking device for bottles, comprising a cap adapted to inclose the top of the bottle and formed of two sections adjustably connected and said cap being recessed or notched at opposite sides, a yoke having arms adapted to grasp the said cap and lie in the recesses thereof, and means for connecting the ends of the arms to prevent their withdrawal from the recesses, substantially as set forth.

5. The herein-described sealing or locking device for bottles, comprising a sectional cap adapted to be fitted over the top of the bottle and having opposite recesses or notches in its sides, the sections being adjustable on one another, a yoke having arms grasping said cap and lying in the recesses or notches thereof, the extremities of said arms being perforated, and fastening means passed through said perforations, substantially as set forth.

6. In a device for sealing or locking bottles, the combination with a cap adapted to extend over the cork and down the sides of the neck, said neck having a shoulder and the cap having a series of stops at its opposite sides, of an independent yoke adapted to straddle said neck and pass between the said shoulder and a pair of opposite stops on the cap, and means for securing together the arms of the yoke beyond their points of engagement with the bottle, substantially as set forth.

7. In a device for sealing or locking bottles, the combination of a cap extending over the cork and downward at the sides of the neck of the bottle and having a series of pairs of opposite stops presenting upwardly-facing stops, said neck having a downwardly-facing shoulder, a yoke clasping said cap and neck and lying between the shoulder on the neck and a pair of stops on the cap, the ends of the arms of said yoke projecting beyond the bottle, and means for locking said ends together, substantially as set forth.

8. A device for sealing or locking bottles, comprising a cap adapted to extend over the cork and downward at the sides of the neck of the bottle and having in its sides a series of pairs of opposite transverse slots or recesses, a yoke independent of said cap and having arms adapted to lie one in each opposite slot of a pair, and means for locking said yoke against removal, substantially as set forth.

In testimony that I claim the foregoing I have hereunto set my hand this 18th day of June, 1900.

PHILIP D. LAIBLE.

Witnesses:
CHARLES H. PELL,
C. B. PITNEY.